United States Patent Office 3,446,071
Patented May 27, 1969

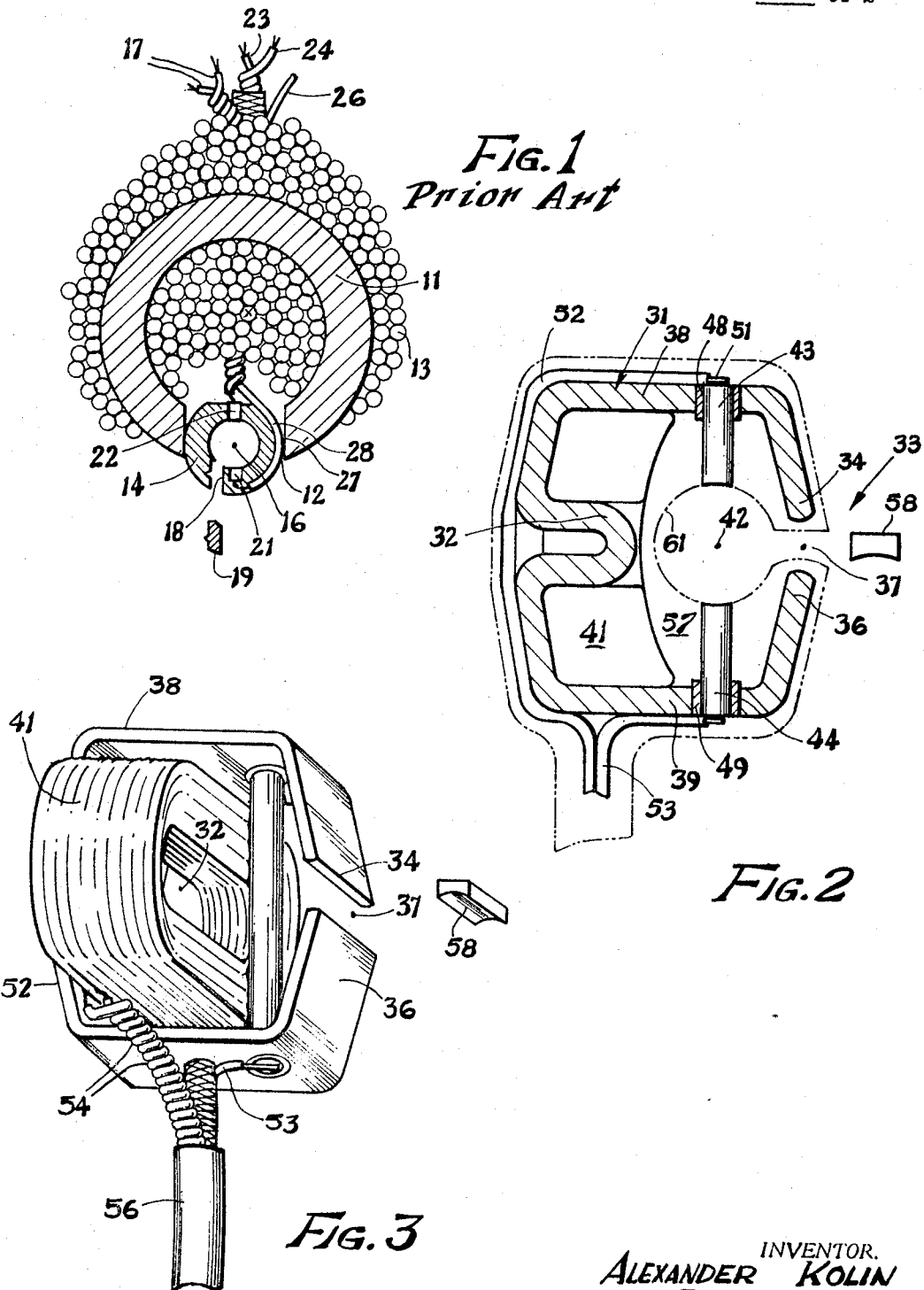

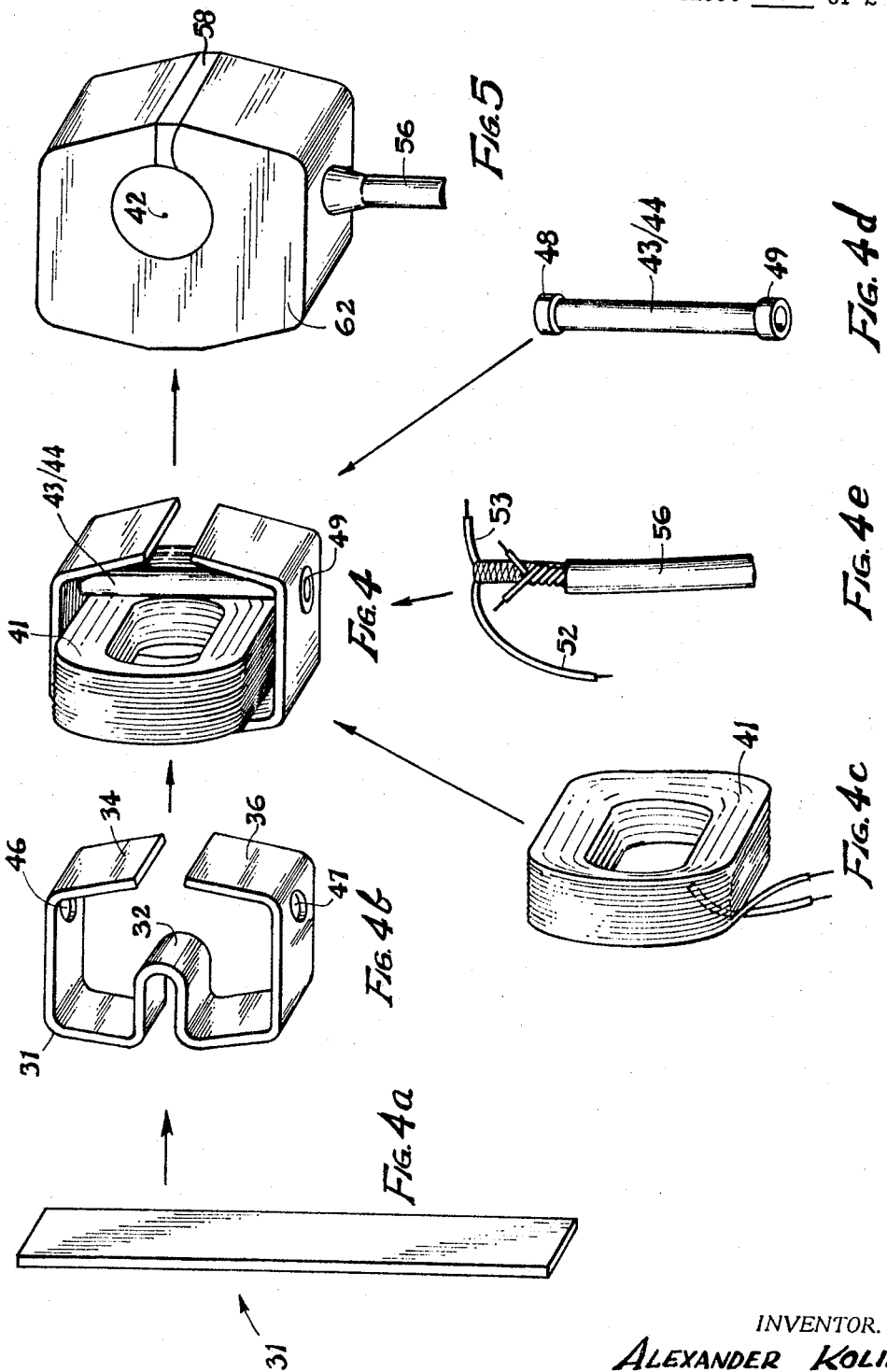

3,446,071
SPLIT-POLE ELECTROMAGNETIC FLOW TRANSDUCER
Alexander Kolin, Bel Air, and James P. Vanyo, Los Angeles, Calif., assignors to Regents of the University of California, Berkeley, Calif.
Filed Nov. 25, 1966, Ser. No. 597,096
Int. Cl. G01f 1/00
U.S. Cl. 73—194                                              7 Claims

ABSTRACT OF THE DISCLOSURE

An electromagnetic flow transducer is provided which includes a split magnetic pole through which a blood vessel may be introduced into the lumen of the transducer, the transducer being constructed to have low bulk, high sensitivity and to be easily and uniformly fabricated.

The invention described herein was made with the aid of the United States Public Health Service Funds.

---

The present invention is a transducer by means of which the rate of flow of fluid may be converted into an electric signal which is a function of that rate of flow. In its broadest application, it may be employed to measure fluid flow in any context. The design, however, is uniquely and especially adapted to a blood flow transducer for measuring the flow of blood in a blood vessel. It is further particularly adapted for in-place measurement, in which the blood vessel is not severed, but in which the transducer is inserted into the body of the animal over and around the unbroken blood vessel. Blood flow transducers in general are usually either of the type having a magnetic core which completes a linkage of magnetic flux across the lumen in which the blood vessel resides, or the coreless type in which the magnetic flux returns via an air path. The present invention is of the former type.

For a full understanding of this invention, there will follow a brief discussion of the prior art type of cored flow transducer; then a description of the transducer of the present invention; and then a unique process for making the same. For this purpose, reference will be had to the following drawings wherein:

FIGURE 1 is a cross-sectional view illustrative of a prior art, cored magnetic core flow transducer.

FIGURE 2 is a cross-section of a flow transducer constructed in accordance with the present invention.

FIGURE 3 is a perspective view, partially exploded, showing certain essential components of the present invention.

FIGURE 4 is a view somewhat similar to FIGURE 3, showing one step in the assembly or fabrication of the present invention.

FIGURES 4a, 4b, 4c, 4d, and 4e are perspective views of various components which are ultimately assembled into the assembly shown in FIGURE 4, and FIGURE 5 is a perspective view of a completed transducer after it has been fully assembled and potted in insulating compound.

The prior art shown in FIGURE 1 consists of a ring magnetic core 11 having a gap 12. The core 11 is surrounded by a coil of wire 13 having as many turns as space will permit. It will be understood that the coil 13 is wound so that current in all of the turns inside of the ring 11 flows in one direction, for example into the paper, and current in all of the turns outside of the ring 11 flows out of the paper.

In the gap 12 is a plastic epoxy sleeve 14, the center portion of which constitutes a lumen 16 adapted to receive a fluid-carrying tube such as a blood vessel. Current is applied to the coil 13 by means of the leads 17 and creates a magnetic field in the lumen within and transverse to the axis of the lumen 16. The sleeve 14 has a slot 18 by means of which the blood vessel may be inserted unbroken into the lumen 16. After insertion of the blood vessel, the slot 18 is closed by a shutter 19 having a shape corresponding to that of the slot 18.

Diametrically embedded in the sleeve 14, transverse to the axis of the lumen 16, and transverse to the magnetic field created by the core 11, are a pair of aligned electrodes 21 and 22. The inner faces of the electrodes 21 and 22 are flush with the lumen 16 so that they come in contact with a tube or blood vessel inserted into the lumen. Electric leads 23 and 24 connect to the electrodes 21 and 22, respectively. A ground lead 26 is connected to an electrode (not shown) which makes contact with the body tissues in the vicinity of the electrodes 21–22.

Major problems with the prior transducers are twofold. First, consider a blood vessel having a diameter of about 1 millimeter; this is a typical size with which these flow transducers are employed. It is evident that only a fraction of a millimeter can be made available for the slot 18 and for the insulation which is necessary to insulate the electrodes 21 and 22 from the core 11 and to insulate the core 11 from the animal tissues. This presents a serious fabrication problem, particularly for mass production, which is essential for low cost.

Secondly, the lead from the electrode 21, which passes in front of the pole face 27 of the pole 11, should be movable to and fro (at right angles to the plane of the drawing). Such movement is required during the fabrication and assembly to adjust the transducer for minimum quadrature voltage induced at zero flow. For maximum magnetic field strength in the lumen 16, the pole gap 12 should be as small as possible. This leaves very little space between the sleeve 14 and the pole face 27 for making this adjustment. The problem is compounded by the fact that this adjustment is so sensitive, because of high intensity of the magnetic field in the gap, that a displacement of the adjustable portion 28 of the lead wire 23 by less than 1 mil results in large signal change. This complicates not only the process of adjustment, but also the subsequent potting in insulating or potting material, since the slightest accidental displacement of the lead wire during potting will destroy a painstakingly achieved adjustment.

The present invention minimizes and virtually eliminates the above shortcomings of the prior art flow transducer. This is done by a design in which fabrication and assembly can be achieved economically and with a high degree of precise reproducibility. The present design creates ample space for the introduction of the blood vessel by locating the entry slot into the lumen away from the electrodes. The present design also provides for locating the electrode lead wires outside of the iron core, where the displacement adjustment is much less critical, thus greatly facilitating adjustment after assembly and before potting, to secure minimum error signal at zero flow.

The present invention provides a structure in which one of the pole pieces is split, the split in the pole piece providing a gap through which entrance is achieved into the lumen of the transducer. This design is uniquely susceptible to inexpensive fabrication in jigs and fixtures, which insure maximum uniformity of structure and, hence, of reproducibility with minimum fabrication costs. The structure of the present transducer also provides a design in which the electrodes may be positioned in place with maximum uniformity and minimum danger of displacement during subsequent fabrication steps.

A detailed description of the present invention will now be given with reference to the remaining drawings, beginning with FIGURE 2.

In this figure, 31 represents a magnetic core having two pole pieces 32 and 33. The pole piece 33 is split into two poles 34 and 36, by the formation of a slot 37 separating the two poles 34 and 36. The configuration of the magnetic core 31 is generally that of the letter E. The shorter pole piece 32 forms the center arm of the E, and the magnetic paths 38 and 39 constitute the longer, outer arms of the E. The outer arms of the E are turned in to form the aforementioned poles 34 and 36, giving the entire core a configuration akin to the Greek letter omega.

Mounted over the encircling the center arm 32 is an energizing coil 41. Current in the coil 41 generates magnetic flux in the core 31, thus creating at any given moment, poles of given polarity, for example, a north pole at the pole piece 32, and a south pole at the pole piece 33, i.e. the poles 34 and 36.

Since the center arm 32 is appreciably shorter than the outer arms 38 and 39 of the E, there remains between the arms 38 and 39 a passageway or lumen portion 42 of the transducer in which fluid may flow in a direction normal or perpendicular to the plane of FIGURE 2. The magnetic flux between the poles 32 and 33 is thus transverse to the axis of the lumen 42 and, hence, transverse to fluid flow therein.

A pair of electrodes 43 and 44 face each other across the lumen 42 and are disposed on a line transverse to the lumen and transverse to the direction of the center arm 32, and, hence, transverse to the magnetic flux. The electrodes 43 and 44, and the line on which they are disposed, pass through bores 46 and 47 (FIGURE 4b), respectively, in the respective outer arms 38 and 39 of the E-shaped core 31. The electrodes 43 and 44 are of conducting material and are insulated in the bores 46 and 47 by means of insulating grommets 48 and 49, respectively.

A lead wire for the electrode 43 is electrically secured thereto at 51 and extends around the outside of the E-shaped core 31, as shown at 52, to the opposite side of the core, where it joins company with a lead 53, similarly secured and extending from the electrode 44. Suitable leads 54 (FIGURE 3) are connected to the coil 41 to provide energizing current thereto. All of the leads 52, 53, and 54 are sheathed in a common cable 56 and brought out of the transducer to suitable connections.

The split or slot 37 in the pole piece 33 forms an entryway by means of which a fluid-carrying tube may be inserted into the lumen. The respective faces of the electrodes 43 and 44 bear against the outside of such tube to provide pick-off contact with the fluid flowing in the tube, in the well-known manner.

The electrical and magnetic parts heretofore described are encapsulated in a molded insulating potting compound to form the encircling body 57, shown by the shaded portion in FIGURE 2. This body has a gap corresponding to the gap 37 to retain the entranceway into the lumen 42. The gap is closed after insertion of the fluid-carrying tube by a suitably shaped shutter 58 in a manner well known to the art.

The design and configuration of this transducer lends itself well to mass production with precise reproducibility. A modern requirement for even moderate scale production requires that a design be compatible with production techniques. Certain features inherent in the design of prior art transducers make it difficult or impossible to efficiently apply mass production techniques to their fabrication. Such modern techniques, however, must be used to solve two important problems in transducer design, namely, repeatability of construction parameters from product to product, and low-cost fabrication. Existing designs require skilled personnel to perform the necessary fabrication procedures. Because of the predominantly manual nature of the initial fabrication and assembly steps, it is difficult or impossible to achieve adequate reproducibility in important construction components and details. Also, the need for skilled personnel greatly magnifies the per unit cost of each transducer.

Reproducibility of configuration and disposition of construction elements can be maintained only if all components are fabricated identically and if identical procedures are followed in assembling them into a finished product. Tolerances within a few mils must be maintained on all initial dimensions, both in component fabrication and in assembly. The present design is uniquely and simply adapted to precision mass production wih relatively unskilled personnel.

The basic steps in the fabrication technique of the present invention are illustrated on the montage-like sheet of drawings containing FIGURES 4 through 5.

Fabrication starts with a strip of magnetic material, such as steel, shown in FIGURE 4a, which is ultimately to become the magnetic core 31. The blank shown in FIGURE 4a is placed in a bending jig or a series of bending jigs, in which a center loop is first formed which ultimately becomes the center arm 32 of the E. Symmetrical bends are then made successively, proceeding outwardly from the center of the blank shown in FIGURE 4, until the final shape shown in FIGURE 4b is achieved. All of the cores will be substantially identical steps in the same jig or series of jigs.

By use of a single strip of iron, the center leg 32 is readily formed as an inwardly-projecting loop shown in FIGURE 4b. If desired, the hollow central portion of this loop may be filled with a magnetic insert to lower the magnetic reluctance of the pole piece 32. By use of the aforementioned jigs, it has been found possible to attain reproducibility in the cores 31 within approximately two mils.

The E-shaped core 31 is then placed in a drill jig so that the holes or bores 46 and 47 may be accurately and precisely drilled therein. Coils 41 may be readily and identically formed on suitable jigs or mandrels and then pressed into place over the loop 32 and bonded in place by a suitable interim bonding compound.

In accordance with the present invention, precision location of the electrodes 43 and 44 is achieved by inserting a single conductor 43/44 (FIGURE 4d) in the bores 46 and 47, spanning the outside arms 38 and 39 of the E-shaped core 31. Grommets 48 and 49 insulate the conductor 43/44 from the core, where it passes through the bores. As will be explained hereinafter, the center portion of the conductor 43/44 is later removed, leaving the two facing and aligned electrodes 43 and 44.

The lead wire 53 is electrically secured to the lower end of the conductor 43/44, adjacent to the grommet 49. The lead wire 52 is taken around the outside of the E core 31, as shown in FIGURE 2 and secured to the upper end of the conductor 43/44.

The assembly is now placed in a potting or encapsulating mold and the entire assembly is potted with a nonconducting potting compound. Thereafter, the lumen 42, having the circular dimension shown at 61, in FIGURE 2, is bored through the potted assembly. This drilling or boring operation which forms the lumen 42, removes not only the center portion of the potting compound 62 (FIGURE 5) but also removes the central portion of the conductor 43/44, leaving at each side of the bore 61 the opposed faces of the aligned electrodes 43 and 44. The entrance slot 37 is then milled through the potting compound, giving access to the lumen 42, and a suitably shaped shutter 58 is inserted, as shown in FIGURE 5, thereby completing the assembly of the transducer.

During fabrication and prior to the potting step, suitable lateral adjustment is made in the lead 52 to eliminate error signals. The adjustment is rendered much easier than in prior art apparatus such as shown in FIGURE 1, by virtue of the fact that the electrode leads 52 and 53 are outside of the magnetic core 31. The electrode leads, therefore, reside in a region of relatively low magnetic flux density, where the physical adjustment is much less critical than where the leads are in a high flux density portion of the circuit, as for example in FIGURE 1.

If desired, the electrode leads may be kept outside of the potting operation and the adjustment may be made thereafter. Following such adjustment, the leads are then cemented in place at the proper adjusted position.

From the above description, it will be seen that there has been provided a unique configuration and process for the production of an electromatic magentic flow transducer which readily lends itself to low-cost, precise, mass production, and which is easily adjusted during the final fabrication steps to produce the fine adjustments required in a precision transducing device.

What is claimed is:

1. Flow sensor for measuring rate of flow of fluid comprising: a magnetic core of generally E-shaped configuration, the center arm of the E being substantially shorter that the two outer arms so as to leave a passageway transverse of the center arm and between the two outer arms, the outer arms being turned in to form a first split pole at the ends thereof, and energizing coil encircling said center arm to create a second pole at the end of said center arm, so that a magnetic field generated by current in said coil extends between said second pole and said first pole and exists transversely of fluid flow in said passageway between said outer arms, and a pair of electrodes facing each other and disposed on a line transverse to said passageway and transverse to said center arm, said line extending essentially parallel to said turned-in portions of said outer arms, and extending through said outer arms, and the faces of said electrodes being disposed contiguous to said passageway and forming part of a circuit for sensing fluid flow.

2. Flow sensor adapted to receive a fluid-carrying tube, comprising:

a magnetic core of generally E-shaped configuration, the center arm of the E being substantially shorter than the two outer arms so as to leave a lumen portion transversely of the center arm and between the two outer arms, the outer arms being turned in to form a first split pole at the ends thereof, an energizing coil encircling said center arm to create a second pole at the end of said center arm, the tube being insertable into the sensor between said turned-in ends of said outer arms into said lumen portion so that a magnetic field generated by current in said coil extends between said second pole and said first pole and exists transversely of fluid flow in the tube, and a pair of electrodes facing each other and disposed on a line transverse to the tube and to said center arm, said line extending essentially parallel to the turned-in portions of said outer arms and extending through said outer arms, and the faces of said electrodes being disposed to contact the tube when the latter is positioned in the sensor.

3. Sensor in accordance with claim 2, wherein:

said core is formed of a single piece of elongate magnetic material, and said center arm is formed as an inwardly-extending loop.

4. Sensor in accordance with claim 2, wherein:

each said outer arm has a bore through which said line and the corresponding electrode pass, said electrodes being insulated from electrical contact with said outer arms.

5. Sensor in accordance with claim 4, including a pair of electrode leads extending from the respective electrodes, adjacent the outer surface of the E core, and to the exterior of the sensor.

6. Process for the production of a fluid flow sensor, comprising:

mounting a coil on the center arm of an E-shaped core in position to create a magnetic field within the interior of the E core when said coil is subjected to electric current, potting said core and coil in a non-conducting potting compound, boring a lumen through the compound in the interior portion of the E, and cutting away an entrance into the lumen between the outer arms of the E to permit insertion of a fluid-carrying tube into the lumen.

7. Process in accordance with claim 6, including:

disposing a substantially straight conductor across the E core and transverse to each of the outer arms of the E, prior to said potting, said boring removing not only potting compound, but also the central portion of said conductor, leaving at each side of the bore a pair of electrode faces contiguous to the lumen.

References Cited

UNITED STATES PATENTS

| 2,607,223 | 8/1952 | Fleming | 73—194 |
| 3,184,966 | 5/1965 | Thornton et al. | 73—194 |
| 3,319,106 | 5/1967 | Hertz | 313—161 |

CHARLES A. RUEHL, *Primary Examiner.*